US008816895B2

(12) United States Patent
Young et al.

(10) Patent No.: US 8,816,895 B2
(45) Date of Patent: Aug. 26, 2014

(54) TARGET-TRACKING RADAR CLASSIFIER WITH GLINT DETECTION AND METHOD FOR TARGET CLASSIFICATION USING MEASURED TARGET EPSILON AND TARGET GLINT INFORMATION

(75) Inventors: Brett J. Young, Tucson, AZ (US); Jason A. Johnson, Green Valley, AZ (US)

(73) Assignee: Raytheon Company, Waltham, MA (US)

(*) Notice: Subject to any disclaimer, the term of this patent is extended or adjusted under 35 U.S.C. 154(b) by 597 days.

(21) Appl. No.: 13/087,527

(22) Filed: Apr. 15, 2011

(65) Prior Publication Data

US 2013/0342384 A1 Dec. 26, 2013

(51) Int. Cl.
  *G01S 13/66* (2006.01)
  *G01S 7/292* (2006.01)
  *G01S 13/00* (2006.01)
  *G01S 7/00* (2006.01)

(52) U.S. Cl.
  USPC .................. 342/90; 342/27; 342/73; 342/74; 342/75; 342/80; 342/89; 342/91; 342/94; 342/95; 342/97; 342/118; 342/146; 342/147; 342/149; 342/175; 342/195

(58) Field of Classification Search
  USPC ................. 382/100, 103; 367/87, 99, 100; 342/73–82, 89–103, 147–155, 175, 342/192–197, 27, 28, 159–164, 118, 146
  See application file for complete search history.

(56) References Cited

U.S. PATENT DOCUMENTS

| | | | | |
|---|---|---|---|---|
| 3,341,850 A | * | 9/1967 | Kings et al. | 342/149 |
| 3,603,995 A | * | 9/1971 | Howard | 342/80 |
| 3,665,463 A | * | 5/1972 | Kubanoff | 342/27 |
| 3,733,603 A | * | 5/1973 | Johnston | 342/192 |
| 3,913,099 A | * | 10/1975 | Wehner et al. | 342/192 |

(Continued)

FOREIGN PATENT DOCUMENTS

| | | |
|---|---|---|
| DE | 112012001478 T5 | 12/2013 |
| DE | 112012001722 T5 | 1/2014 |

(Continued)

OTHER PUBLICATIONS

"International Application No. PCT/US2012/023083, International Preliminary Report on Patentability dated Oct. 1, 2013", 8 pgs.

(Continued)

*Primary Examiner* — Bernarr Gregory
(74) *Attorney, Agent, or Firm* — Schwegman Lundberg & Woessner, P.A.

(57) ABSTRACT

Embodiments of a target classifier and method for target classification using measured target epsilons and target glint information are generally described herein. The target classifier is configured to compare a total epsilon measurement with target glint information to determine whether to the target being tracked corresponds to an intended target type. Based on the comparison, the target classifier may cause target tracking circuitry of a target-tracking radar to either continue tracking the target or break-off from tracking the target. Glint of different target types may be characterized at different ranges and the target's glint characteristics may be used to distinguish intended from non-intended targets. Accordingly, intended targets such as incoming artillery may be distinguished from non-intended targets such as aircraft to help prevent countermeasures from being launched against non-intended targets.

18 Claims, 4 Drawing Sheets

(56) References Cited

U.S. PATENT DOCUMENTS

| | | | |
|---|---|---|---|
| 3,935,572 A | | 1/1976 | Broniwitz et al. |
| 3,952,304 A | | 4/1976 | Broniwitz et al. |
| 4,068,231 A | * | 1/1978 | Wilmot .......................... 342/90 |
| 4,148,026 A | * | 4/1979 | Gendreu ........................ 342/80 |
| 4,220,953 A | * | 9/1980 | Carre ............................ 342/94 |
| 4,224,622 A | * | 9/1980 | Schmidt ........................ 342/78 |
| 4,296,415 A | * | 10/1981 | Pelton et al. ................... 342/94 |
| 4,345,252 A | * | 8/1982 | Carre et al. ................... 342/91 |
| 4,368,468 A | * | 1/1983 | Lisle et al. ................... 342/151 |
| 4,387,373 A | | 6/1983 | Longuemare, Jr. |
| 4,486,756 A | * | 12/1984 | Peregrim et al. ............ 342/149 |
| 4,524,359 A | * | 6/1985 | Champagne ................... 342/89 |
| 4,533,916 A | | 8/1985 | Williams |
| 4,719,464 A | * | 1/1988 | Gendreu ...................... 342/149 |
| 5,003,313 A | * | 3/1991 | Doriath ........................ 342/152 |
| 5,014,064 A | | 5/1991 | Spencer et al. |
| 5,049,888 A | | 9/1991 | Prenat |
| 5,192,955 A | * | 3/1993 | Hoang .......................... 342/80 |
| 5,400,035 A | | 3/1995 | Liu |
| 5,949,739 A | * | 9/1999 | Reese ........................... 367/100 |
| 5,960,097 A | | 9/1999 | Pfeiffer et al. |
| 6,215,115 B1 | | 4/2001 | Baker et al. |
| 6,229,475 B1 | | 5/2001 | Woolley |
| 6,337,656 B1 | | 1/2002 | Natsume et al. |
| 6,356,231 B1 | * | 3/2002 | Zheng et al. ................. 342/149 |
| 6,930,633 B1 | | 8/2005 | Epperson |
| 7,132,977 B1 | | 11/2006 | Pillai |
| 7,330,149 B2 | | 2/2008 | Weatherford |
| 7,567,203 B2 | | 7/2009 | Dizaji et al. |
| 7,825,848 B2 | | 11/2010 | Schoettl |
| 2003/0085840 A1 | | 5/2003 | Benner |
| 2003/0189512 A1 | | 10/2003 | Chen et al. |
| 2006/0049978 A1 | | 3/2006 | Siegel |
| 2006/0220951 A1 | | 10/2006 | Thome et al. |
| 2010/0026559 A1 | | 2/2010 | Siegel |
| 2010/0079328 A1 | | 4/2010 | Drake et al. |
| 2013/0328714 A1 | | 12/2013 | Turner et al. |

FOREIGN PATENT DOCUMENTS

| | | |
|---|---|---|
| JP | 03-183982 A | 8/1991 |
| JP | 03183982 A | 8/1991 |
| WO | WO-2012/134620 A1 | 10/2012 |
| WO | WO-2012/141787 A1 | 10/2012 |

OTHER PUBLICATIONS

"International Application Serial No. PCT/US2012/025200, International Preliminary Report on Patentability mailed Oct. 24, 2013", 6 pgs.

"International Application Serial No. PCT/US2012/023083, International Search Report mailed Sep. 7, 2012", 2 pgs.

"International Application Serial No. PCT/US2012/023083, Written Opinion mailed Sep. 7, 2012", 7 pgs.

"International Application Serial No. PCT/US2012/025200, International Search Report mailed Sep. 21, 2012", 2 pgs.

"International Application Serial No. PCT/US2012/025200, Written Opinion mailed Sep. 21, 2012", 4 pgs.

Hughes, E. J., et al., "Target manoeuvre detection using radar glint", *Electronics Letters*, 34(17), (1998), 1695-1696.

"U.S. Appl. No. 13/075,299, Response filed Mar. 3, 2014 to Non Final Office Action mailed Dec. 31, 2013", 11 pgs.

"U.S. Appl. No. 13/075,299, Notice of Allowance mailed Apr. 7, 2014", 8 pgs.

"U.S. Appl. No. 13/075,299, Non Final Office Action mailed Dec. 31, 2013", 8 pgs.

\* cited by examiner

US 8,816,895 B2

TARGET-TRACKING RADAR CLASSIFIER WITH GLINT DETECTION AND METHOD FOR TARGET CLASSIFICATION USING MEASURED TARGET EPSILON AND TARGET GLINT INFORMATION

GOVERNMENT RIGHTS

This invention was made with United States Government support under Contract Number N00024-07-C-5437 with the Department of the Navy. The United States Government has certain rights in this invention.

RELATED APPLICATION

This application is related to U.S. patent application entitled "TARGET-TRACKING RADAR AND METHOD FOR RESPONDING TO FLUCTUATIONS IN TARGET SNR" filed Mar. 30, 2011 Ser. No. 13/075,299, which is incorporated herein by reference.

TECHNICAL FIELD

Embodiments pertain to target-tracking radars including monopulse radars. Some embodiments relate to target glint detection and target classification. Some embodiments relate to tracking non-maneuvering targets including ballistic targets, such as artillery, munitions, mortars, rockets and missiles. Some embodiments relate to distinguishing targets of interest from targets of non-interest.

BACKGROUND

Target-tracking radars, such as monopulse radars, are configured to track targets by simultaneously transmitting a single radar pulse in two or more lobes and are able to obtain, among other things, angle information from the single pulse. One issue with target-tracking radars is discriminating between targets of interest from targets of non-interest. Target-tracking radars with sufficiently high bandwidth may inadvertently respond to noise in a target's epsilons (i.e., the off-boresight angles or error estimates). This noise may result from a reduction in a target's signal-to-noise ratio (SNR) which results in an increase in the variance of the measured epsilons. This makes discriminating between targets of interest from targets of non-interest difficult.

Thus, there are general needs for improved target-tracking radars and methods that can discriminate targets of interest from targets of non-interest. There are also general needs for target-tracking radars and methods that can reject a target of non-interest while maintain tracking a target of interest.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
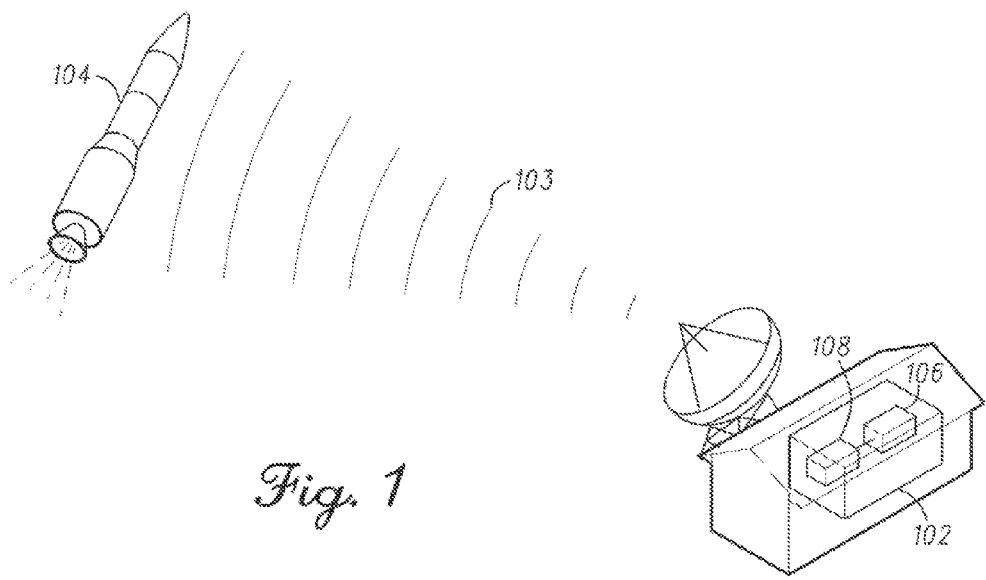
FIG. 1 illustrates an operational environment of a target-tracking radar in accordance with some embodiments.

FIG. 1 illustrates an operational environment of a target-tracking radar in accordance with some embodiments. Target-tracking radar 102 may be configured to track one or more targets, such as target 104, based on the reception of radar-return signals from the target 104. Target direction relative to boresight may be determined based on a comparison of the return signals. In some embodiments, the target-tracking radar 102 may be a monopulse radar and may be configured to track the target 104 by simultaneously transmitting a single radar pulse in two or more lobes 103 to obtain angle information. In these embodiments, the return signals from each lobe may be amplified separately and compared to each other allowing, among other things, the direction of the target 104 relative to boresight to be determined. Since this comparison may be carried out during one pulse, changes in target position or heading will have little or no effect on the comparison.

In accordance with embodiments, the target-tracking radar 102 includes, among other things, a target classifier 106 and target-tracking circuitry 108. The target classifier 106 may be configured for classifying a target 104 using measured target epsilons and target glint information, as well as a target-track range. In these embodiments, the target classifier 106 may be configured to compare a total epsilon measurement with the target glint information to determine whether the target 104 being tracked is an intended target type. Based on this comparison and other information, the target tracking circuitry 108 may either continue tracking the target 104 or break-off from tracking the target 104. Accordingly, the target-tracking radar 102 can discriminate targets of interest from targets of non-interest. These embodiments are discussed in more detail below.

In some embodiments, for each dwell, a total angular measurement (i.e., a target epsilon) is compared to a threshold based on a theoretical total epsilon noise value. Based on this comparison, a target-tracking flag may be set to cause the target tracking circuitry 108 to break-off from tracking the target 104. These embodiments are further discussed in more detail below.

Accordingly, a target that is determined to be too 'glinty' at a current tracking range than it should be for its target type may indicate that the target being tracked is a different target type. For example, if artillery is intended to intended be tracked, the target may appear more glinty than expected at a particular range when the target being tracked is actually another target type (such as an aircraft). The accurate classification of target type may, for example, help prevent countermeasures from being directed at non-intended targets. In these embodiments, the glint of different target types may be characterized at different ranges and the target's glint characteristics may be used to distinguish intended from non-intended targets.

In some embodiments, the target-tracking radar 102 is configured to track the position of the target 104 at range. In some embodiments, the target-tracking radar 102 may be part of a land-based or ship-based missile defense system to detect, track and engage incoming rockets and artillery fire, although the scope of the embodiments are not limited in this respect as the target-tracking radar 102 may be used for tracking almost any target object.

Figure 2A:
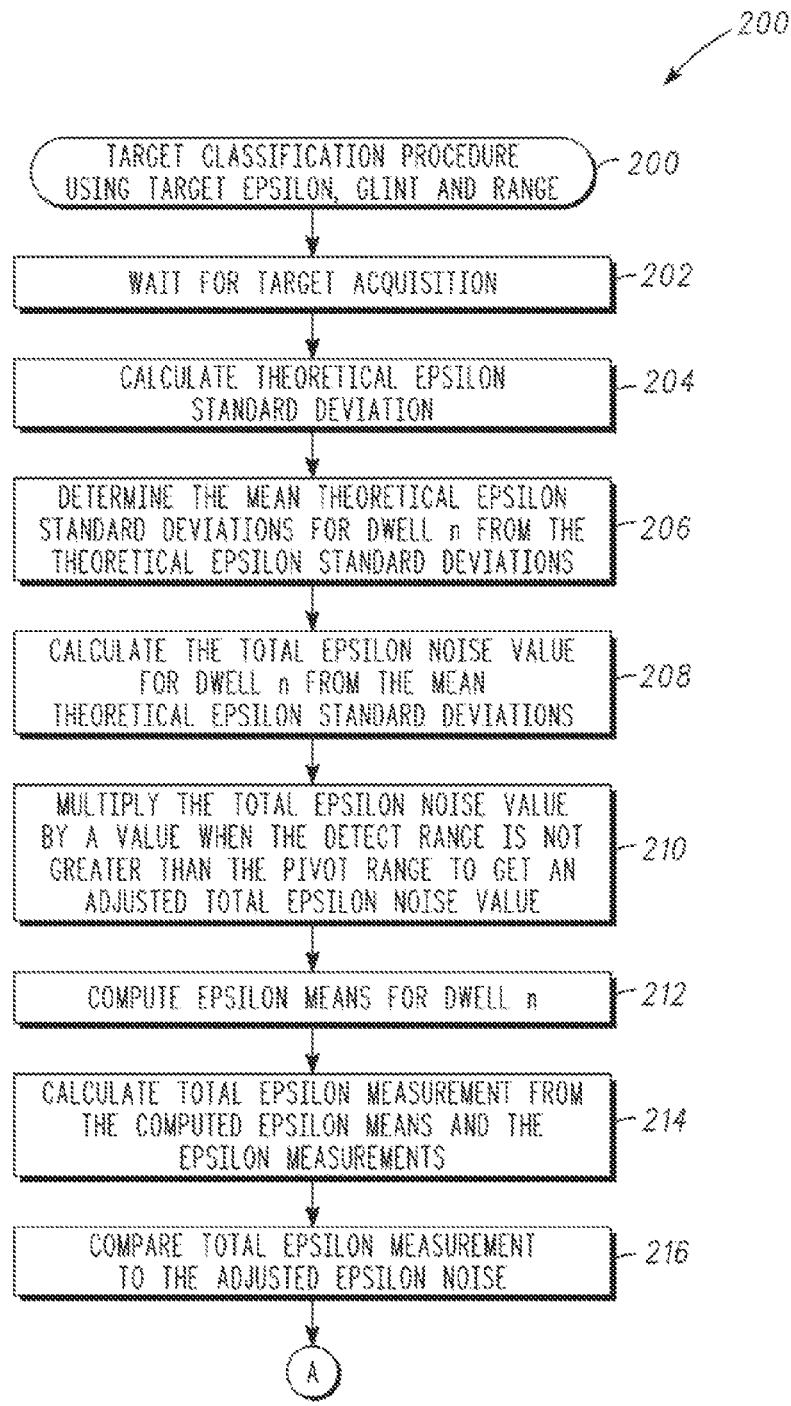
FIG. 2 is a flow-chart of a target-classification procedure in accordance with some embodiments.
Figure 2B:
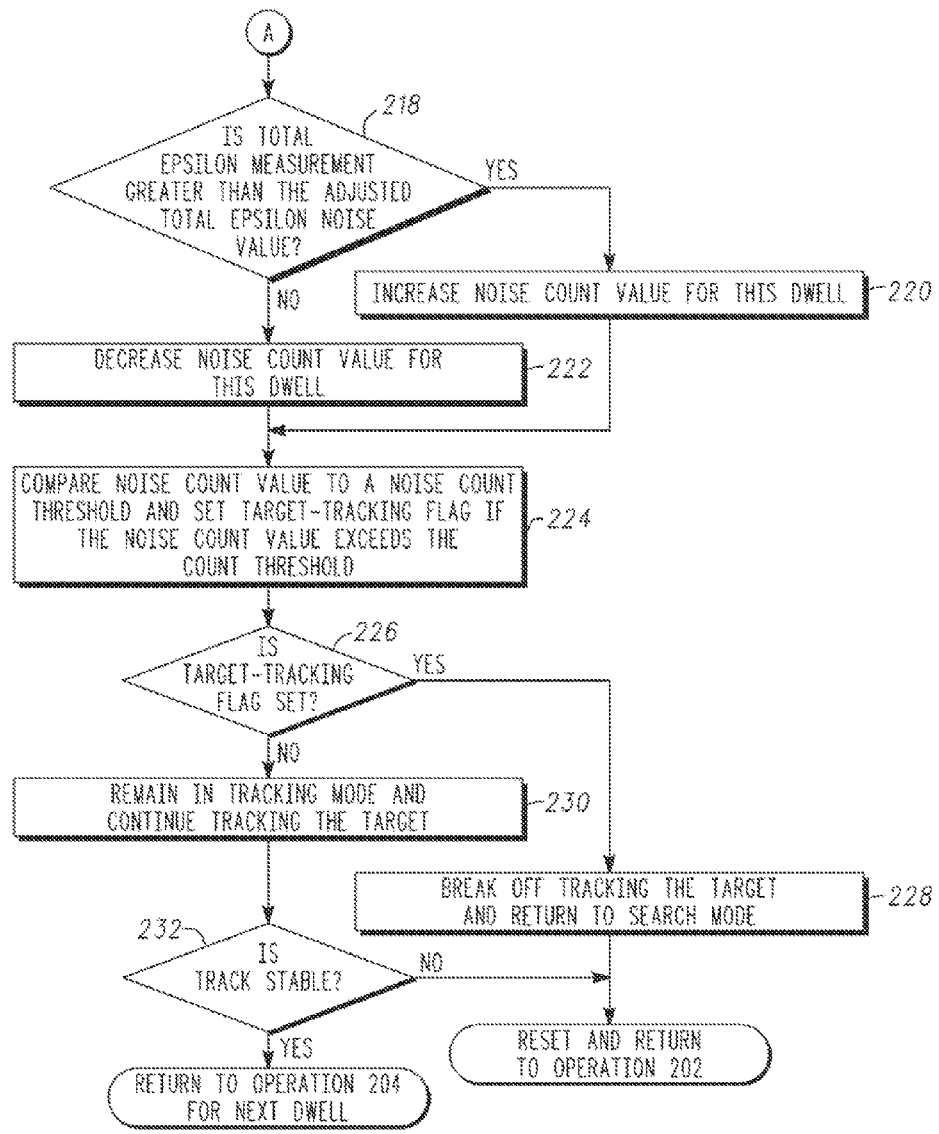

FIG. 2 is a flow-chart of a target-classification procedure in accordance with some embodiments. The target-classification procedure 200 may be performed by the target classifier 106 (FIG. 1) of the target-tracking radar 102 (FIG. 1). In procedure 200, for each dwell, a total epsilon (i.e., angular) measurement is compared to a threshold based on a theoretical total epsilon noise value for an intended target type. Based on this comparison, a target-tracking flag may be set to cause the target tracking circuitry 108 (FIG. 1) to break-off from tracking the target 104 (FIG. 1) if, for example the target is a non-intended target type.

For example, both incoming aircraft and incoming artillery appear as point targets at further range, however, aircraft targets transition to non-point targets earlier than artillery targets. This transition occurs at what is referred to as a pivot range. During this transition, the total epsilon measurement for a target begins to exceed the theoretical epsilon noise value for the intended target type.

Procedure 200 may use the following inputs: signal power, azimuth angle (azimuth epsilon), elevation angle (elevation epsilon), track range, nominal noise power, moving average one-sided window length, azimuth slope antenna factor, elevation slope antenna factor, noise threshold multiplier, up/down counter threshold, maximum processing voltage gain, and pivot range. Some of these inputs may depend on the intended target type.

In operation 202, the target classifier 106 may be configured to wait until the target 104 is acquired and the tracking is stable (i.e., the target 104 has settled into a stable track). Once the tracking is stable, as part of operations 204 through 232 described below, the total angular measurement (the epsilon) may be compared to a threshold based on a theoretical total epsilon noise value for every dwell.

In operation 204, the target classifier 106 may be configured to calculate theoretical epsilon standard deviations (i.e., the monopulse errors in both azimuth and elevation) for the current dwell (i.e., dwell n) based on a nominal noise power and normalized signal power of the received signals. These are given as follows for dwell n:

$$\sigma_{n,AZ} = G \cdot K_{AZ} \cdot \sqrt{\frac{N_{nom}}{P_{signal,n}}}$$

$$\sigma_{n,EL} = G \cdot K_{EL} \cdot \sqrt{\frac{N_{nom}}{P_{signal,n}}}$$

Where, $\sigma_{n,AZ}$ is the azimuth channel theoretical standard deviation for dwell n, $\sigma_{n,EL}$ is the elevation channel theoretical standard deviation for dwell n, $K_{AZ}$ is the azimuth channel K factor (the hard-coded constant), $K_{EL}$ is the elevation channel K factor (the hard-coded constant), G is the maximum processing voltage gain, $N_{nom}$ is the nominal noise power (the hard-coded constant), and $P_{norm,n}$ is the normalized signal power for dwell n (from the input argument).

In operation 206, the target classifier 106 may be configured to calculate the means of the theoretical epsilon standard deviations for the current dwell using a windowed average of the theoretical epsilon standard deviations. The mean theoretical epsilon standard deviations for a point target for dwell n may be determined as follows:

$$\bar{\sigma}_{n,AZ} = \frac{1}{2L+1} \sum_{i=n-L}^{n+L} \sigma_{i,AZ}$$

$$\bar{\sigma}_{n,EL} = \frac{1}{2L+1} \sum_{i=n-L}^{n+L} \sigma_{i,EL}$$

Where, $\bar{\sigma}_{n,AZ}$ is the mean theoretical azimuth epsilon standard deviation for dwell n, $\bar{\sigma}_{n,EL}$ is the mean theoretical elevation epsilon standard deviation for dwell n, L is the moving average one-sided window length (e.g., a hard-coded constant), and $\sigma_{i,AZ}$ is the theoretical azimuth epsilon standard deviation value for dwell i.

$\sigma_{i,EL}$ is the theoretical elevation epsilon standard deviation value for dwell i.

In operation 208, the target classifier 106 may be configured to calculate a total epsilon noise value for a current dwell from means of theoretical epsilon standard deviations. The theoretical total epsilon noise value for dwell n may be defined by:

$$\sigma_{n,total} = \sqrt{\bar{\sigma}_{n,AZ}^2 + \bar{\sigma}_{n,EL}^2}$$

Where, $\sigma_{n,total}$ is the theoretical total epsilon noise value for dwell n, $\bar{\sigma}_{n,AZ}$ is the theoretical azimuth epsilon standard deviation for dwell n, and $\bar{\sigma}_{n,EL}$ is the theoretical elevation epsilon standard deviation for dwell n.

As the target 104 moves closer in range, multiple scatters will resolve and the target 104 may no longer look like a point target and the glint may increase. Accordingly the target angle noise will change making the angle noise a piecewise function.

In operation 210, the target classifier 106 may be configured to adjust the total epsilon noise value for the current dwell based on a pivot range and detect range. The total epsilon noise value may be multiplied by an additional value to get the adjusted total epsilon noise value as follows:

If $R_n >= R_p$ $\sigma_{n,adj} = \sigma_{n,total}$

Else $$\sigma_{n,adj} = \sigma_{n,total} \cdot \frac{R_p^3}{R_n^3}$$

End If

Where, $\sigma_{n,adj}$ is the theoretical total epsilon noise value for dwell n, $\sigma_{n,total}$ is the theoretical total epsilon noise value for dwell n, $R_p$ is the pivot range, and $R_n$ is the detect range for dwell n from the input argument.

The total epsilon measurement may be calculated as described in operations 212 through 216 as follows:

In operation 212, the target classifier 106 may be configured to compute epsilon means by performing a windowed average of the measured target epsilons. The measured target epsilons comprise the off-boresight errors. The epsilon means may be computed for dwell n by:

$$\hat{\mu}_{n,AZ} = \frac{1}{2L+1} \sum_{i=n-L}^{n+L} \varepsilon_{i,AZ}$$

$$\hat{\mu}_{n,EL} = \frac{1}{2L+1} \sum_{i=n-L}^{n+L} \varepsilon_{i,EL}$$

Where,
$\hat{\mu}_{n,AZ}$ is the measured azimuth epsilon mean for dwell n,
$\hat{\mu}_{n,EL}$ is the measured elevation epsilon mean for dwell n,
L is the moving average one-sided window length, and
$\epsilon_{i,AZ}$ is the azimuth epsilon value for dwell i.
$\epsilon_{i,EL}$ is the elevation epsilon value for dwell i.

In operation 214, the target classifier 106 may be configured to calculate a total epsilon measurement for the current dwell from the off-boresight errors. The total epsilon measurement may be calculated by subtracting the epsilon means from the measured target epsilons for the current dwell. The total epsilon measurement may be calculated as follows:

$$\epsilon_{n,total} = \sqrt{(\epsilon_{n,AZ}-\hat{\mu}_{n,AZ})^2 + (\epsilon_{n,EL}-\hat{\mu}_{n,EL})^2}$$

Where,
$\epsilon_{n,total}$ is the total epsilon measurement for dwell n,
$\epsilon_{n,AZ}$ is the azimuth epsilon measurement for dwell n,
$\epsilon_{n,EL}$ is the elevation epsilon measurement for dwell n,
$\hat{\mu}_{n,AZ}$ is the measured azimuth epsilon mean for dwell n, and
$\hat{\mu}_{n,EL}$ is the measured elevation epsilon mean for dwell n.

In operation 216, the target classifier 106 may be configured to compare the total epsilon measurement with the adjusted total epsilon noise value to determine whether to increase or decrease a noise count value. In operation 218 when the total epsilon measurement is determined to be greater than the total epsilon noise value, operation 220 is performed. When the total epsilon measurement is not greater than the total epsilon noise value, operation 222 may be performed.

In operation 220, the target classifier 106 may be configured to increase the noise count value for the current dwell. This is because the target is noisier or glintier at the current range than expected for the intended target type.

In operation 222, the target classifier 106 may be configured to decrease the noise count value for the current dwell.

For example, for dwell n, operations 220 and 222 may be described as follows:
IF $\epsilon_{n,total} > k \cdot \sigma_{n,adj}$ THEN
   NoiseCount$_n$=min(NoiseCount$_{n-1}$+1, CountThresh+1)
ELSE
   NoiseCount$_n$=max(NoiseCount$_{n-1}$−1, 0).
ENDIF
Where,
NoiseCount$_n$ is the up/down count for dwell n,
NoiseCount$_{n-1}$ is the up/down count for dwell n−1,
k is the noise threshold multiplier (the hard-coded constant),
CountThresh is the up/down counter threshold (which may be a hard-coded constant for a particular target type).

The term max(NoiseCount$_{n-1}$−1, 0) helps ensure that the count cannot fall below zero. The term min(NoiseCount$_{n-1}$+1, CountThresh+1) caps the count at just above the threshold. The count may be initialized to zero.

In operation 224, the target classifier 106 may be configured to compare the noise count value with the noise count threshold. The target classifier 106 may set the target tracking flag when the noise count value exceeds the noise count threshold. For example,
IF NoiseCount$_n$>CountThresh THEN
   NoiseFlag$_n$=true
ELSE
   NoiseFlag$_n$=false.
ENDIF
Where,
CountThresh is the up/down counter threshold (the hard-coded constant),
NoiseFlag$_n$ is the noise check flag for dwell n, and
NoiseCount$_n$ is defined as above.

This comparison of operation 224 may take place every dwell as long as the track detection type remains equal to a predetermined value (e.g., five) indicating that the target is in track for a consecutive number of dwells. If the track detection type for a dwell falls under this value, the epsilon comparison may cease until the track detection type has been equal to this value for a number (i.e., 2L+1) consecutive dwells again. In these embodiments, the noise count value may remain the same until this comparison resumes. If the track mode indicator shows that the system is no longer in track, procedure may return to operation 202 as described below.

In operation 226, the target classifier 106 may be configured to determine if the target-tracking flag is set. If the target-tracking is set, operation 228 is performed. When the target-tracking flag is not set, operation 230 may be performed.

In operation 228, the target classifier 106 may be configured to instruct the target-tracking circuitry 108 to break off from tracking the current target 104 the target-tracking is set and in some embodiments cause the target-tracking radar 102 to return to search mode. In this case, the target that was being tracked was a non-intended target.

In operation 230, the target classifier 106 may be configured instruct the target-tracking circuitry 108 to remain in tracking mode and continue tracking the target. In this case, the target that is being tracked appears to be an intended target, at least at the current range.

In operation 232, the target classifier 106 may be configured to determine if the track is stable. If the track is stable and the target 104 is in track, operations 204 through 230 may be repeated for the next dwell. If the track is not stable, the noise count value may be reset and operation 202 may be performed unit the tracking is stabilized.

Figure 3:
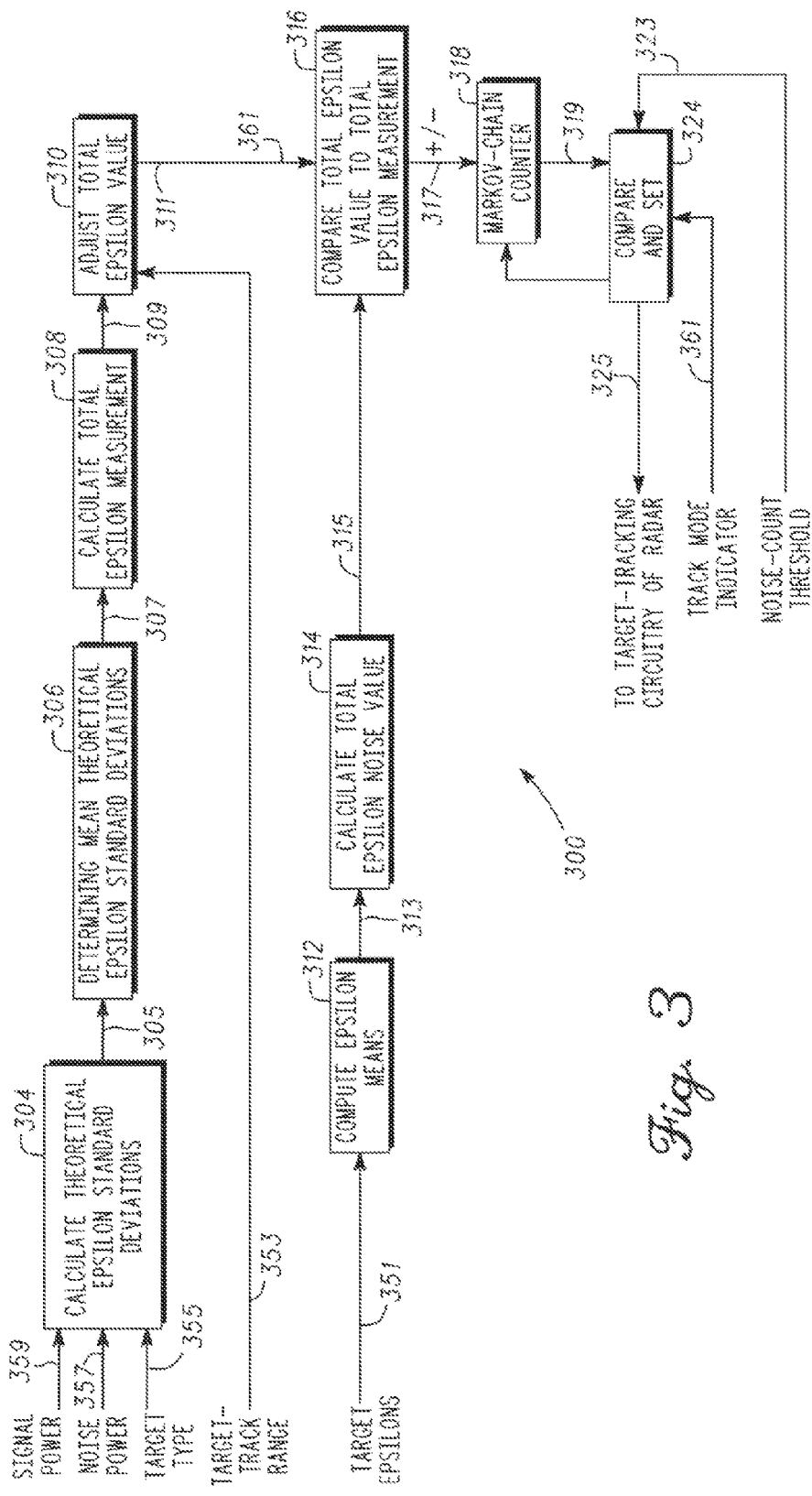
FIG. 3 is a functional block diagram of a target classifier in accordance with some embodiments.

FIG. 3 is a functional block diagram of a target classifier in accordance with some embodiments. Target classifier 300 may be suitable for use as target classifier 106 (FIG. 1), although other target classifier configurations may also be suitable. Target classifier 300 may also be suitable for performing target-classification procedure 200 (FIG. 2), although other target classifier configurations may also be suitable.

In accordance with embodiments, the target classifier 300 may be configured for classifying a target 104 (FIG. 1) using, among other things, measured target epsilons 351 and target glint information 361. In these embodiments, the target classifier 300 may compare a total epsilon measurement 315 with the target glint information 361 to determine whether to the target 104 being tracked corresponds to an intended target type. Based on the comparison, target tracking circuitry 108 (FIG. 1) may be configured to either continue tracking the target 104 or break-off from tracking the target 104. The measured target epsilons 351 comprise a total angular measurement based on the target's off-boresight errors which are generated from received signals (i.e., radar return signals) that comprise a sum signal, an azimuth delta signal and an elevation delta signal.

The off-boresight errors of a target 104 may also be referred to as a target's off-boresight angles. The sum signal, the azimuth delta signal and the elevation delta signal are described, for example in U.S. patent application Ser. No. 13/075,299.

Target classifier 300 includes circuitry 304 to calculate theoretical epsilon standard deviations 305 (i.e., the monopulse errors azimuth and elevation) for the current dwell (i.e., dwell n) based on a nominal noise power 357 and normalized signal power 350 of the received signals.

In some embodiments, based on a track-mode indicator 361, the target classifier 300 is further configured to refrain from calculating the theoretical epsilon standard deviations 305 until the target tracking is stable (i.e., the target 104 has settled into track). In these embodiments, track-mode indicator 361 may indicate that the target 104 is being tracked (is in track) and that the tracking has stabilized. Prior to the target being tracked, the target-tracking radar 102 may operate in a target-acquisition mode. Once the target 104 is acquired, the target-tracking radar 102 may operate in a target-tracking mode.

Target classifier 300 includes circuitry 306 to calculate the means 307 of the theoretical epsilon standard deviations 305 for the current dwell using a windowed average of the theoretical epsilon standard deviations 305.

Target classifier 300 also includes circuitry 308 to calculate a total epsilon noise value 309 for the current dwell from means 307 of theoretical epsilon standard deviations 305. Target classifier 300 may also include circuitry 310 to adjust the total epsilon noise value 309 for the current dwell based on a pivot range and detect range for the intended target type and generate an adjusted total epsilon noise value 311.

Target classifier 300 may include circuitry 312 to compute epsilon means 313 by performing a windowed average of the measured target epsilons 351. The measured target epsilons 351 comprise the off-boresight errors. Target classifier 300 may also include circuitry 314 to calculate the total epsilon measurement 315 by subtracting the epsilon means 313 from the measured target epsilons 351 for the current dwell.

Target classifier 300 may also include circuitry 316 to compare the total epsilon measurement 315 with the adjusted total epsilon noise value 311 to determine whether to increase or decrease a noise count value 319. The noise count value 319 may be increased for the current dwell when the total epsilon measurement 315 is greater than the total epsilon noise value 309. The noise count value 319 for the current dwell may be decreased when the total epsilon measurement 315 is not greater than the total epsilon noise value 309.

In these embodiments, the noise count value 319 is increased for a target that is noisier or glintier than expected for the particular target type. On the other hand, the noise count value 319 is decreased when the target is less noisy or less glinty than expected for the particular target type.

In some embodiments, the target classifier 300 may include counter circuitry, such as a Markov-chain counter 318, to maintain the noise-count value 319 based on +/− signals 317 from the comparison performed by circuitry 316.

Target classifier 300 may also include circuitry 324 to compare the noise count value 319 to a noise count threshold 323 for each dwell. Circuitry 324 may also be configured to set a target tracking flag 325 when the noise count value 319 exceeds the noise count threshold 323. In response to the target tracking flag 325 being set, the target tracking circuitry 108 (FIG. 1) of the target-tracking radar 102 (FIG. 1) may be configured to break off from tracking the current target 104 and in some embodiments return to search mode.

In these embodiments, the target-tracking radar 102 may be configured to break off from tracking a target 104 because the target 104 is noisier than expected at the current rage, which is indicated by the noise count value 319 (the total count) exceeding the noise count threshold 323. The target tracking flag 325 may be set (e.g., flag=true) and provided to the target tracking circuitry 108 of the target-tracking radar 102. In these embodiments, the target-tracking flag 325 is not set as long as the noise count value 319 does not exceed the noise count threshold 323.

In some embodiments, setting the target-tracking flag 325 may indicate that the target 104 is too glinty for the current tracking range for the target type that is intended to be tracked. For example, if artillery is intended to be tracked, the target may appear glintier than expected at a particular target-track range 353 indicating that an aircraft (or another target type) may be being tracked rather than artillery.

In some embodiments, the target tracking circuitry 108 may cause the target-tracking radar 102 to remain in tracking mode and continue tracking the target 104 as long as the target-tracking flag 325 is not set. As long as the target-tracking flag 325 is not set and while the target tracking circuitry 108 is tracking the target 104, countermeasures, for example, may be launched at the target 104. These embodiments may allow countermeasures to be launched against a particular target type (e.g., artillery) and may help prevent countermeasures from being launched against a non-intended target (e.g., aircraft).

In some embodiments, the target tracking flag 325 may be reset (e.g., flag=false) when the track-mode indicator 361 indicates that the target 104 is no longer being tracked. This may occur, for example, when the target-tracking radar 102 breaks off from tracking the current target 104 and begins tracking a new target (such as during target acquisition of operation 202). The Markov-chain counter 318 may be reset (i.e., the noise count value 319 may be set to zero) when the track-mode indicator 361 indicates that the target 104 is no longer being tracked or that the track is unstable.

Target types that may be distinguished by the target classifier 300 may include artillery from aircraft, commercial aircraft from military aircraft, types of aircraft (e.g., FA18, F16, B737 or small private aircraft), artillery from missiles, etc. In some embodiments, the target classifier 300 may be configured to determine whether to continue to track a target or to refrain from tracking the target based on the target type since target glint is pre-characterized at different ranges for different target types (and captured as target glint information 361 for comparison to measured values).

In some embodiments, the various circuitry elements of the target classifier 106 described above may be implemented by one or more processors including, for example, combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the circuitry elements of the target classifier 106 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the target classifier 106 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A target classifier for classifying a target using measured target epsilons and target glint information, the target classifier configured to:
   compare a total epsilon measurement with the target glint information to determine whether to the target being tracked corresponds to an intended target type,
   wherein based on the comparison, target tracking circuitry is configured to either continue tracking the target or break-off from tracking the target.

2. The target classifier of claim 1 wherein the measured target epsilons comprise a total angular measurement based on the target's off-boresight errors which are generated from received signals that comprise a sum signal, an azimuth delta signal and an elevation delta signal.

3. The target classifier of claim 2 wherein to classify the target, the target classifier is further configured to:
   calculate a total epsilon noise value for a current dwell from means of theoretical epsilon standard deviations;
   calculate a total epsilon measurement for the current dwell from the off-boresight errors;
   increase a noise count value for the current dwell when the total epsilon measurement is greater than the total epsilon noise value; and
   decrease the noise count value for the current dwell when the total epsilon measurement is not greater than the total epsilon noise value.

4. The target classifier of claim 3 further configured to:
   calculate theoretical epsilon standard deviations for the current dwell based on a nominal noise power and normalized signal power of the received signals; and
   calculate the means of the theoretical epsilon standard deviations for the current dwell using a windowed average of the theoretical epsilon standard deviations.

5. The target classifier of claim 4 wherein based on a track-mode indicator, the target classifier is further configured to refrain from calculating the theoretical epsilon standard deviations until the target tracking is stable.

6. The target classifier of claim 3 further configured to:
   adjust the total epsilon noise value for the current dwell based on a pivot range and detect range; and
   compare the total epsilon measurement with the adjusted total epsilon noise value to determine whether to increase or decrease the noise count value.

7. The target classifier of claim 3 wherein to calculate the total epsilon measurement for the current dwell, the target classifier is further configured to:
   compute epsilon means by performing a windowed average of the measured target epsilons, the measured target epsilons comprising the off-boresight errors; and
   calculate the total epsilon measurement by subtracting the epsilon means from the measured target epsilons for the current dwell.

8. The target classifier of claim 3 further configured to:
   compare the noise count value to a noise count threshold for each dwell;
   set a target tracking flag when the noise count value exceeds the noise count threshold,
   wherein in response to the target tracking flag being set, the target tracking circuitry of a target-tracking radar is configured to break off from tracking the target.

9. The target classifier of claim 8 wherein the target tracking circuitry is configured to cause the target-tracking radar to remain in tracking mode and continue tracking the target as long as the target-tracking flag is not set.

10. A method for distinguishing an intended target from a non-intended target comprising:
    calculating a total epsilon noise value from means of theoretical epsilon standard deviations;
    adjusting the total epsilon noise value based on a pivot range and detect range;
    calculating a total epsilon measurement from off-boresight errors;
    increasing a noise count value for a current dwell when the total epsilon measurement is greater than the total epsilon noise value; and
    identifying a currently tracked target as a non-intended target when the noise count value exceeds a noise count threshold for an intended target type.

11. The method of claim 10 further comprising setting a flag to instruct target-tracking circuitry to break-off from tracking the currently tracked target when the currently tracked target is identified as a non-intended target type.

12. The method of claim 11 further comprising:
    computing epsilon means by performing a windowed average of the measured target epsilons, the measured target epsilons comprising the off-boresight errors; and
    calculating the total epsilon measurement by subtracting the epsilon means from the measured target epsilons for the current dwell.

13. The method of claim 12 further comprising:
    calculating theoretical epsilon standard deviations for the current dwell based on a nominal noise power and normalized signal power of the received signals; and
    calculating the means of the theoretical epsilon standard deviations for the current dwell using a windowed average of the theoretical epsilon standard deviations.

14. The method of claim 13 further comprising decreasing the noise count value for the current dwell when the total epsilon measurement is not greater than the total epsilon noise value.

15. A target-tracking radar comprising:
    a target classifier to distinguish an intended target from a non-intended target; and
    target-tracking circuitry responsive to the target classifier to refrain from tracking a non-intended target,
    wherein the target classifier is configured to:
    calculate a total epsilon noise value for A current dwell from means of theoretical epsilon standard deviations;
    adjust the total epsilon noise value for the current dwell based on a pivot range and detect range;
    calculate a total epsilon measurement for THE current dwell from off-boresight errors;
    increase a noise count value for the current dwell when the total epsilon measurement is greater than the total epsilon noise value; and
    instruct the target-tracking circuitry to break-off from tracking a currently tracked target when the noise count value exceeds a noise count threshold for an intended target type.

16. The target tracking radar of claim 15 wherein the target classifier is further configured to:
- compute epsilon means by performing a windowed average of the measured target epsilons, the measured target epsilons comprising the off-boresight errors;
- calculate the total epsilon measurement by subtracting the epsilon means from the measured target epsilons for the current dwell.

17. The target tracking radar of claim 16 wherein the target classifier is further configured to:
- calculate theoretical epsilon standard deviations for the current dwell based on a nominal noise power and normalized signal power of the received signals; and
- calculate the means of the theoretical epsilon standard deviations for the current dwell using a windowed average of the theoretical epsilon standard deviations.

18. The target tracking radar of claim 17 wherein the target classifier is further configured to decrease the noise count value for the current dwell when the total epsilon measurement is not greater than the total epsilon noise value.

* * * * *